United States Patent
Khan et al.

(10) Patent No.: US 8,055,116 B2
(45) Date of Patent: Nov. 8, 2011

(54) METHOD AND SYSTEM FOR PROVIDING AUDIO-ONLY RECORDING OF AN AUDIO/VIDEO SIGNAL

(75) Inventors: Mohammad Ayub Khan, Santa Clara, CA (US); Haroon Ur Rashid, Islamabad (PK); Muhammad Israr Khan, Islamabad (PK); Mushtaq Ahmad Mughal, Islamabad (PK)

(73) Assignee: Streaming Networks (Pvt.) Ltd., Santa Clara, CA (US)

( * ) Notice: Subject to any disclaimer, the term of this patent is extended or adjusted under 35 U.S.C. 154(b) by 1213 days.

(21) Appl. No.: 11/191,490

(22) Filed: Jul. 27, 2005

(65) Prior Publication Data

US 2007/0025702 A1 Feb. 1, 2007

(51) Int. Cl.
*H04N 5/765* (2006.01)
(52) U.S. Cl. ......................... 386/230; 386/326
(58) Field of Classification Search ............ 386/96, 386/83, 126, 98, 104–106, 230–232, 326
See application file for complete search history.

(56) References Cited

U.S. PATENT DOCUMENTS

| | | | | |
|---|---|---|---|---|
| 4,396,941 A * | 8/1983 | Nishimura et al. | ............ | 348/552 |
| 5,337,292 A * | 8/1994 | Aoki | ................................ | 369/2 |
| 5,367,316 A * | 11/1994 | Ikezaki | ........................ | 345/158 |
| 5,496,178 A * | 3/1996 | Back | ......................... | 434/307 A |
| 5,691,778 A * | 11/1997 | Song | ................................ | 725/59 |
| 6,076,063 A * | 6/2000 | Unno et al. | .................... | 704/500 |
| 6,138,147 A | 10/2000 | Weaver et al. | | |
| 6,249,641 B1 * | 6/2001 | Yokota | ............................. | 386/94 |
| 6,467,093 B1 * | 10/2002 | Inoue et al. | ................... | 725/151 |
| 6,842,604 B1 | 1/2005 | Cook et al. | | |
| 6,895,165 B2 | 5/2005 | Boys | | |
| 2002/0129383 A1 * | 9/2002 | Wasilewski | ................... | 725/139 |
| 2003/0147631 A1 * | 8/2003 | Zimmermann | ................ | 386/95 |
| 2003/0218693 A1 * | 11/2003 | Ikeguchi | ....................... | 348/554 |
| 2004/0022519 A1 * | 2/2004 | Lee | .................. | 386/52 |
| 2005/0120373 A1 * | 6/2005 | Thomas et al. | ................ | 725/58 |
| 2006/0146787 A1 * | 7/2006 | Wijnands et al. | ............. | 370/352 |

FOREIGN PATENT DOCUMENTS

| | | | |
|---|---|---|---|
| EP | 1058456 | * | 12/2000 |
| JP | 63-296418 | * | 12/1988 |
| KR | 2004079042 | * | 9/2004 |

OTHER PUBLICATIONS

Streaming networks (Pvt.) Ltd.; PCT/US06/28195 Filed Jul. 20, 2006, International Search Report and Written Opinion, ISA/US, mailed Aug. 8, 2007, 9pp.

* cited by examiner

*Primary Examiner* — David Harvey
(74) *Attorney, Agent, or Firm* — Firasat Ali

(57) ABSTRACT

A method for providing audio-only recording is disclosed. According to the method, a combined video stream and an audio stream are received from a source. The audio stream is digitized, if in analog form. The digitized audio stream is compressed using an audio encoding engine. The encoded audio stream is saved in a storage device. The storage device can be local or on a network. In the case of the input A/V signal being a multiplexed and compressed digital signal, the audio segment(s) are separated using a demultiplexer and saved in a storage device. The encoding format of the stored audio data follows that of the original audio data embedded in the multiplexed A/V stream. To store the audio data in a different encoded format, the audio data is first decoded using an appropriate audio decoder and then re-encoded in the desired encoding format. Alternatively, an audio transcoder can be used to store the audio data in the desired encoding format.

9 Claims, 2 Drawing Sheets

METHOD AND SYSTEM FOR PROVIDING AUDIO-ONLY RECORDING OF AN AUDIO/VIDEO SIGNAL

BACKGROUND

1. Field

The present invention generally relates to multi-media program recording, and more specifically to recording of the audio-only segment of a multi-media program.

2. Background

Digital video recorders (DVRs), personal video recorders (PVRs), DVD players, set-top boxes (STBs), televisions and other similar consumer electronic (CE) devices, provide recording and/or playback of audio/video (A/V) contents. The CE devices, which have a recording feature, record both audio and video mostly in multiplexed form. At times, user may wish to record only the audio segment(s) of the A/V contents, which may be a favorite song, section of a sound track of a movie, news, weather information, stock quotes or other desired audio information of a particular A/V stream. This audio-only recording of A/V contents can be provided as an additional feature in the existing CE devices or can be realized as a separate device receiving an A/V signal. The device could be called a digital audio recorder (DAR), personal audio recorder (PAR), and the like.

Audio-only recording lets the users record the audio segment(s) of an incoming A/V stream. The A/V stream may originate from a number of sources including, for example, analog or digital TV broadcast, movies on DVDs or video CD discs, video-on-demand sources and other similar A/V sources. Audio-only recording feature is useful and desirable since it lets user record audio segment(s) of their liking without being bothered about the video portion. Furthermore, the requirement for storage space is much less in audio-only cases and, hence, removable media with limited storage capacity like memory sticks, compact flash and other similar devices are ideal for storing and carrying the recorded audio contents.

There does not seem to be any conventional mechanism which allows audio segment(s) to be recorded from an A/V stream. Hence, it would be desirable to provide methods and systems that are capable of providing audio-only recording of A/V contents being played.

SUMMARY OF THE INVENTION

In one embodiment, while incoming A/V signals are being received and displayed, such signals can also be digitized, compressed and recorded. There are occasions when one desires to record only the audio components of the incoming A/V signals. Such audio components may include perhaps the catchy jingle in a commercial, sound track of a movie, audio portion in the video of a song, stock quotes, weather information or news etc. The recording can be done in a storage device which may include a removable medium (e.g., compact flash, memory stick, USB flash drives, micro drives and the like), hard disk or any other similar storage media. The storage device can be a local device or a network-attached device. The present invention can be used in or with TVs, PVRs, DVRs, DVD/CD players, satellite and terrestrial STBs and other similar CE devices.

On invocation of an audio-only record command, the audio component of the incoming A/V signal is digitized, if such signal is in analog form. The digitized audio component is compressed by an audio encoder and saved in a storage device. In the case of incoming A/V signal being a multiplexed and compressed digital signal, the audio component is demultiplexed using a demultiplexer and saved in the storage device. The encoding format of the stored audio component follows that of the original format of the audio embedded in the incoming, multiplexed A/V signal. To store the audio component in a different encoding format, the audio component can be first decoded using an appropriate audio decoder and then re-encoded in the desired encoding format. Alternatively, an audio transcoder can be employed to process and store the audio component in the desired encoding format.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The description includes specific details for the purpose of providing an understanding of the present invention.

One or more embodiments of the present invention will now be described. The present invention provides an audio-only record mode which allows audio segment(s) to be recorded from an A/V signal. The present invention may be incorporated in existing CE devices or manufactured as a stand-alone CE device for that purpose.

In various embodiments, in CE devices, such as TVs, DVRs, PVRs, STBs and DVD players etc., appropriate circuitry can be added to provide a mode for recording audio-only segment(s) of A/V contents being viewed. In other embodiments, a stand-alone device can be realized which records only the audio portion(s) of A/V contents provided by an A/V source.

Figure 1:
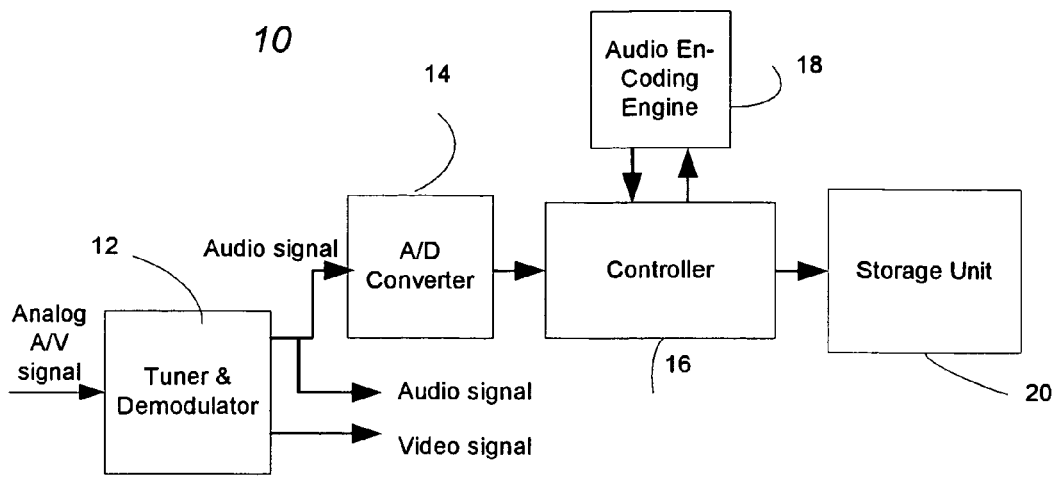
FIG. 1 is a simplified block diagram illustrating one embodiment of the present invention where an incoming A/V signal is in analog form and its audio-only component is stored in the desired compressed form.

FIG. 1 illustrates one embodiment of the present invention. In this embodiment, the system 10 includes an analog tuner and demodulator circuit 12, an analog-to-digital (A/D) converter 14, a controller 16, an audio encoding engine 18 and a storage unit 20. The system 10 is able to record audio-only segment(s) from an A/V signal that is received in analog form. The A/V signal in analog form can be a radio frequency (RF) signal broadcasted via cable or over-the-air and received by TVs, satellite or terrestrial STBs or any other similar devices which process and display the A/V signals for program viewing. The system 10 or an appropriate part of system 10 can be housed in TVs, be a part of STBs and other similar CE devices, or can be made into a stand-alone unit.

The stand-alone unit can receive the output signals generated by CE devices. The stand-alone unit can be coupled to CE devices which have RF output, i.e., devices which put the tuned RF signal to its RF output. The stand-alone unit can also have line inputs which are coupled to the audio outputs (mono or stereo) of CE devices receiving and displaying the A/V contents. The stand-alone unit can further receive broadcasted RF signal directly and output such signal to a display device through its RF output.

The tuner and demodulator circuit 12 receive an analog A/V signal corresponding to a tuned channel. The tuner and demodulator circuit 12 breaks the analog A/V signal down into respective analog video and audio components and output such components separately.

The video and audio components may be provided to circuitry that is configured to play the A/V program. The audio components are also provided to the A/D converter 14. The A/D converter 14 then digitizes the audio components and forwards the digitized audio components to the controller 16.

The controller 16 selects the desired audio encoding and file format that is to be used to encode the digitized audio components for storage. The desired audio encoding and file format may be specified by a user via a menu system provided on an on-screen display (OSD), or through any other input mechanism.

The audio encoding engine 18 compresses the digitized audio components outputted from the A/D converter 14. The compression format is selectable via the controller 16 and may include, for example, an MPEG format, AAC, AC3, AMR or any of the other standard compression formats.

Depending on the file format, the controller 16 may also append any additional information about the compressed audio components before recording such components on the storage unit 20.

The storage unit 20 can be local to the system 10 or on a network. The storage unit 20 may include one of a compact flash, a memory stick, a USB (universal serial bus) flash drive, a micro drive, a hard disk, CDRW, DVD-RW or any other semiconductor, magnetic media or optical based storage device.

Users can start storing the audio portion(s) of their choosing from the A/V signal being viewed by issuing an audio-only record command. Issuing the audio-only record command can be achieved through an input device, such as, a remote control key, a keyboard key or through a selection of a field in a menu provided on an On Screen Display (OSD) of the device. The audio encoding and file format in which the audio components are to be encoded and stored can also be chosen through an OSD menu field.

The audio portion(s) stored in the storage unit 20 may be retrieved by the user for subsequent consumption.

Figure 2:
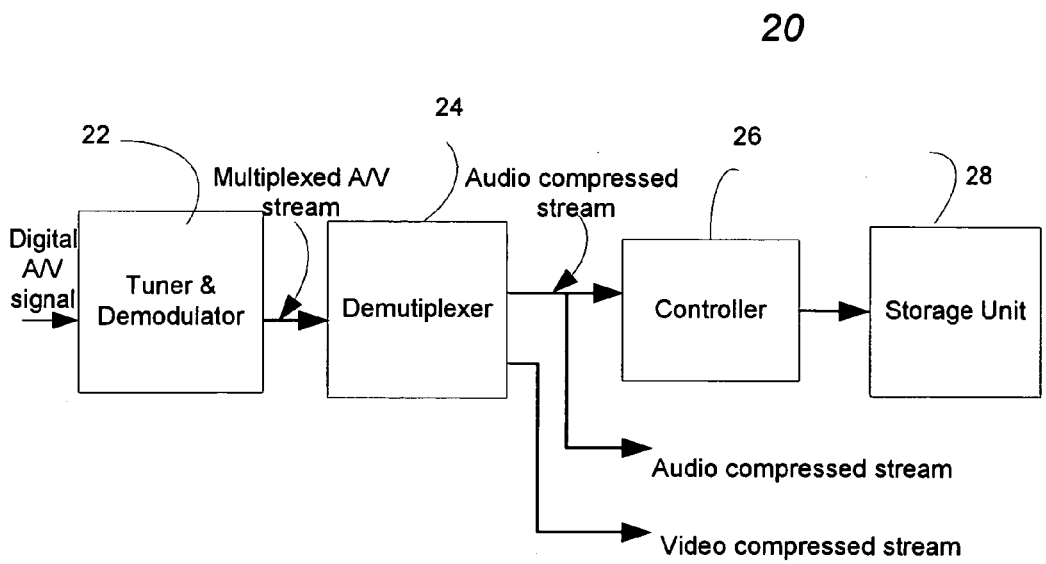
FIG. 2 is a simplified block diagram illustrating another embodiment of the present invention where an incoming A/V signal is in digital form and its audio-only component is stored in the original compressed form.

FIG. 2 illustrates another embodiment of the present invention. The system 20 can be made into a stand-alone unit, housed in TVs or be part of STBs or other similar CE devices.

The system 20 includes a digital TV tuner and demodulator circuit 22, a demultiplexer 24, a controller 26 and a storage unit 28. The system 20 is able to record audio-only segment(s) from A/V contents that are received in multiplexed and compressed form. The incoming digital A/V signal can be one being broadcasted via cable or over-the-air and received by digital TVs, satellite and terrestrial STBs, read from DVD and CD discs or from any other similar devices. The digital A/V contents are generally in MPEG format. The system 20 or sub-set of the system 20 can form part of the digital TV, STBs, and similar devices, in which case, some of the modules of the system 20 (such as, digital tuner and demodulator circuit 22 and demultiplexer 24) shown in FIG. 2 may be part of the CE devices themselves.

Upon invocation of the audio-only record command by the user, the demultiplexer 24 when demultiplexing the incoming A/V signal also forwards the compressed audio stream to the controller 26.

The controller 26 selects the file format that is to be used to store the compressed audio stream. The encoding format of the compressed audio stream to be stored may be that of the originally received A/V signal. Depending upon the file format, the controller 26 may also append any additional information about the compressed audio stream before such audio stream is stored in the storage unit 28.

Figure 3:
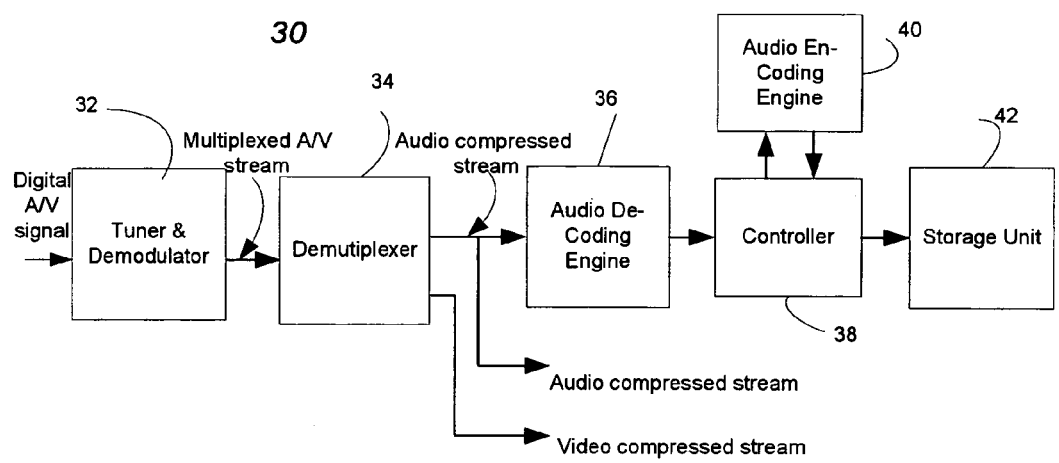
FIG. 3 is a simplified block diagram illustrating another embodiment of the present invention where an incoming A/V signal is in digital form and its audio-only component is stored in the desired compressed form.

FIG. 3 illustrates another embodiment of the present invention. In this embodiment, the system 30 is able to accommodate changing of the encoding format before the compressed audio data is stored on the storage unit 42. The demultiplexer 34 after demultiplexing the A/V stream presents the compressed audio components to the audio decoding engine 36 for decoding. The decoded audio components are then forwarded to an appropriate audio encoding engine 40 selected by the controller 38. It should be noted that there may be a number of audio encoding engines (not shown) each configured to provide a different encoding format. The selection of the audio encoding engine 40 is done via the controller 38 by the user. The encoded audio data outputted from the audio encoding engine 40 is saved in the storage unit 42. The difference between systems 20 and 30 is that the incoming A/V signal is first decoded and then encoded again in the audio encoding format of the user's choice. The audio encoding and decoding engines can be compliant with any of the audio compression standards, such as, the G.7xx series, MPEG Layer I, II and III, AAC, AC3, AMR, iLBC, etc.

Alternatively, instead of decoding first and then re-encoding, direct transcoding can be carried out by a transcoding engine (not shown) to store the audio data in a desired encoding format.

The system 30 or sub-set of the system 30 can form part of digital TVs, STBs, DVD/CD players and similar devices, in which case, some of the modules of the system 30 (such as, the digital tuner and demodulator circuit 32, demultiplexer 34 and audio decoding engine 36) shown in FIG. 3 may be part of the CE devices themselves.

Users can start storing audio portion(s) of their choosing using a remote control key or similar input device directly or through a menu provided on the OSD of the device. The audio encoding format that is to be used to encode the decoded audio data can also be specified through an OSD menu.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A method for providing an audio-only recording of a digital audio and video (A/V) stream, the method comprising:
   receiving the digital A/V stream, the received digital A/V stream including a multiplexed and compressed digital A/V stream;
   demultiplexing the received digital A/V stream into a demultiplexed video stream and a demultiplexed audio stream separate from one another;
   receiving an encoding format selection from a user; and
   in response to receiving an audio-only record command from the user while the digital A/V stream is being received, if the demultiplexed audio stream is of a same format as the encoding format selection from the user, storing the demultiplexed audio stream in a memory without further decoding and re-encoding of the demultiplexed audio stream, otherwise, (i) decoding the demultiplexed audio stream to produce a decoded audio stream, (ii) re-encoding the decoded audio stream based on the encoding format selection to produce a re-encoded audio stream, and (iii) storing the re-encoded audio stream in the memory,
   wherein the audio-only record command is received through an on-screen display (OSD) presented via a device on which a video portion of the digital A/V stream is being displayed.

2. The method of claim 1 further comprising forwarding the demultiplexed video stream and the demultiplexed audio stream to circuitry configured to play the demultiplexed video stream and demultiplexed audio stream.

3. The method of claim 1 wherein the encoding format selection indicates one of a plurality of encoding standards including MPEG Layer I, II, III, AAC, AC3, AMR and iLBC.

4. The method of claim 1 further comprising appending additional information to the re-encoded audio stream before storing the re-encoded audio stream to the memory.

5. The method of claim 1 further comprising retrieving the re-encoded audio stream, or portions thereof, from the memory for subsequent consumption.

6. The method of claim 1 wherein the memory includes one of a compact flash, a memory stick, a USB (universal serial bus) flash drive or a micro drive.

7. The method of claim 1 wherein the memory includes one of a hard disk, CDRW, DVD-RW or a semiconductor, magnetic media or optical based storage device.

8. The method of claim 1 wherein the memory is a local or network storage device.

9. An audio/video device comprising a processor executing the steps of:
   receiving a digital A/V stream, the received digital A/V stream including a multiplexed and compressed digital A/V stream;
   demultiplexing the received digital A/V stream into a demultiplexed video stream and a demultiplexed audio stream separate from one another;
   receiving an encoding format selection from a user; and
   in response to receiving an audio-only record command from the user while the digital A/V stream is being received, if the demultiplexed audio stream is of a same format as the encoding format selection from the user, storing the demultiplexed audio stream in a memory without further decoding and re-encoding of the demultiplexed audio stream, otherwise, (i) decoding the demultiplexed audio stream to produce a decoded audio stream, (ii) re-encoding the decoded audio stream based on the encoding format selection to produce a re-encoded audio stream, and (iii) storing the re-encoded audio stream in the memory,
   wherein the audio-only record command is received through an on-screen display (OSD) presented via a device on which a video portion of the digital A/V stream is being displayed.

* * * * *